United States Patent
Joo

(10) Patent No.: US 8,229,500 B2
(45) Date of Patent: Jul. 24, 2012

(54) MOBILE TERMINAL

(75) Inventor: Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 937 days.

(21) Appl. No.: 12/262,058

(22) Filed: Oct. 30, 2008

(65) Prior Publication Data

US 2009/0111515 A1    Apr. 30, 2009

(30) Foreign Application Priority Data

Oct. 31, 2007 (KR) .................. 10-2007-0110585

(51) Int. Cl.
*H04W 88/02* (2009.01)

(52) U.S. Cl. ............ 455/556.1; 455/550.1; 455/566; 455/557

(58) Field of Classification Search .......... 455/556.1, 455/566, 556.2, 552.1, 550.1, 557, 575.1, 455/90.2, 90.1

See application file for complete search history.

(56) References Cited

U.S. PATENT DOCUMENTS 6,518,956 B1 * 2/2003 Sato ............................ 345/173
2001/0004269 A1 6/2001 Shibata et al.
2002/0015102 A1 2/2002 Itoh et al.
2007/0120960 A1 * 5/2007 Chang .................... 348/14.02
2011/0281618 A1 * 11/2011 Chambers et al. ......... 455/556.1

FOREIGN PATENT DOCUMENTS

| EP | 1 564 968 A1 | 8/2005 |
|---|---|---|
| WO | WO-01/84269 A2 | 11/2001 |
| WO | WO 2007/000490 A1 | 1/2007 |

* cited by examiner

*Primary Examiner* — John J Lee

(74) *Attorney, Agent, or Firm* — Birch, Stewart, Kolasch & Birch, LLP

(57) ABSTRACT

A mobile terminal includes a terminal body having a display and a wireless communication module, a camera body disposed adjacent to the terminal body in a longitudinal direction, and coupled to the terminal body so as to rotate at a certain angle in a clockwise or counterclockwise direction such that an optical axis of a lens formed on the camera body is perpendicular to the longitudinal direction; and a display mode controller for controlling the display such that a first available set of modes is outputted on the display if the camera body is rotated in a first direction, and a second available set of modes is outputted on the display if the camera body is rotated in a second direction.

14 Claims, 14 Drawing Sheets

MOBILE TERMINAL

BACKGROUND OF THE INVENTION

1. Field of the Invention

The present invention relates to a mobile terminal having a movable camera.

2. Description of the Background Art

A mobile terminal is a device that can be carried around and has one or more functions for performing voice and video call communications, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Various attempts have been made to implement complicated functions in such a multimedia device by means of hardware or software. For instance, a user interface environment is provided in a mobile terminal to enable a user to easily and conveniently search for or select among available functions.

As information communications fields have been developed, individual users, not an expert group, are participating in creating faster and more direct information than the existing media, called 'User Created Contents (UCC).' The UCC allowing the user to upload pictures and videos on the Internet, and enables other users to easily view and enjoy such uploaded pictures and videos. A camera mounted in a mobile terminal has been incorporated with a wireless (radio) transmission/reception function provided in the mobile terminal, thereby enabling general users to create the UCC or transmit the contents through a server device or the Internet, thereby providing excellent usage.

SUMMARY OF THE INVENTION

Therefore, it is an object of the present invention to provide a mobile terminal which facilitates capturing an image or video.

Another object of the present invention is to provide a mobile terminal which performs a selection of a corresponding mode according to an orientation of a camera.

To achieve these and other advantages and in accordance with the purposes of the present invention, as embodied and broadly described herein, a mobile terminal is provided, including: a terminal body having a display at a front surface thereof for displaying an object to be taken, and having a wireless communication module; a camera body disposed adjacent to the terminal body in a longitudinal direction, and coupled to the terminal body so as to rotate at an angle in a clockwise or counterclockwise direction such that an optical axis of a lens formed on the camera body is perpendicular to the longitudinal direction; and a display mode controller for controlling the display such that a first available set of modes is outputted on the display if the camera body is rotated in a first direction and a second available set of modes is outputted on the display if the camera body is rotated in a second direction. Accordingly, if the camera body is rotated, the mobile terminal may output an available set of modes according to the rotation direction of the camera body, thereby performing an operation appropriate to a position of the camera body.

The display may further include a touch input unit for performing a touch input function, thereby manipulating a set of modes displayed as an icon or a graphical image in a touch sensitive manner.

The camera body may be formed to have a length long enough to support the terminal body when rotated by a certain rotation angle such that the terminal body maintains a certain angle with respect to the ground. Accordingly, if the camera body is positioned upright with respect to the ground, for instance, information related to the camera manipulation may be displayed to the user in an upright state, thereby enhancing a convenience to the user.

A slide preventing member may be disposed at a portion where the camera body and the terminal body contact the ground(or surface) so as to prevent the mobile terminal from sliding with respect to the ground (or surface). The slide preventing member may be formed of a rubber or silicon material, thereby providing a stable screen display without being vibrated during a video call for long hours or during a broadcast reception.

As one embodiment of the present invention, the first rotation direction of the camera body is one in which the lens recedes from the user, and the first set of modes includes at least one of a picture capturing mode and a video capturing mode.

As one embodiment of the present invention, the second rotation direction of the camera body is one in which the lens approaches the user, and the second set of modes includes a picture viewing mode, and a video viewing mode added to the first set of modes. In addition, the second set of modes may include a video call mode.

The terminal body further includes a broadcast receiving module, and the second set of modes further comprises a broadcast receiving mode.

As one embodiment of the present invention, a terminal body position sensing unit may be included for sensing a position of the terminal body with respect to the ground when the camera body is rotated, and outputting a capture-related control information displayed on the display in an upright state with respect to the ground. Here, the terminal body position sensing unit may include a geomagnetic sensor disposed in the terminal body for sensing terrestrial magnetism; and a controller for receiving a sensing signal from the geomagnetic sensor so as to properly orient the capture-related control information displayed on the display.

A hinge module may be disposed between the terminal body and the camera body such that the camera body stops rotating every time it reaches a certain rotation angle.

The hinge module includes: a first hinge member fixed to one of the terminal body and the camera body; a second hinge member fixed to another one of the terminal body and the camera body, and having a stopping recess concavely formed in a shaft direction; and an elastic stopper rotating by engagement with the first hinge member, and having a protrusion protruding in correspondence to the stopping recess such that the protrusion is stopped by the stopping recess by an elastic effect.

The hinge module includes: a first hinge member fixed to one of the terminal body and the camera body; a second hinge member fixed to another one of the terminal body and the camera body; a cam member restricted by the first hinge member and having a stopping recess concavely formed on an outer circumference thereof in a radial direction; and an elastic stopper rotating by engagement with the second hinge member, and having a protrusion protruding in correspondence to the stopping recess such that the protrusion is stopped by the stopping recess by an elastic effect.

The camera body further includes a plurality of manipulation buttons for reproducing or editing a captured picture or video. Such plurality of manipulation buttons related to the camera allow the user to perform a fast and accurate manipulation of the camera. The manipulation buttons may include zoom-in/zoom-out buttons and a capturing button.

To achieve these and other advantages and in accordance with the purposes of the present invention, as embodied and broadly described herein, there is provided a mobile terminal, including: a terminal body having a display at a front surface thereof; a camera body rotatably coupled to an upper or lower end of the terminal body such that an orientation angle of a lens is perpendicular to a surface of the display, and for forming a bar shape by being combined with the terminal body at a certain rotation angle; and a display mode controller for outputting a first available set of modes on the display if the camera body is rotated in a first direction, and for outputting a second available set of modes on the display if the camera body is rotated in a second direction.

To achieve these and other advantages and in accordance with the purposes of the present invention, as embodied and broadly described herein, there is provided a method of controlling a mobile terminal having a terminal body including a wireless communication module and a display, and a camera body rotatably attached to the terminal body, the camera body being rotatable with respect to the terminal body in a first clockwise direction and in a second counterclockwise direction, the method including outputting a first available set of modes onto the display when the camera body is rotated in the first direction, and outputting a second available set of modes onto the display when the camera body is rotated in the second direction.

To achieve these and other advantages and in accordance with the purposes of the present invention, as embodied and broadly described herein, there is provided a mobile terminal, including a terminal body having a wireless communication module, a camera body rotatably attached to the terminal body, the camera body being rotatable with respect to the terminal body between a non-rotated position and a rotated position, and at least one manipulation key provided to one of the terminal body and the camera body, wherein the manipulation key performs a communication related function when the camera body is in the non-rotated position, and performs a camera related function when the camera body is in the rotated position.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

In the drawings.

DETAILED DESCRIPTION OF THE INVENTION

Hereinafter, description will be given in detail of the mobile terminal according to the present invention, examples of which are illustrated in the accompanying drawings.

Figure 1:
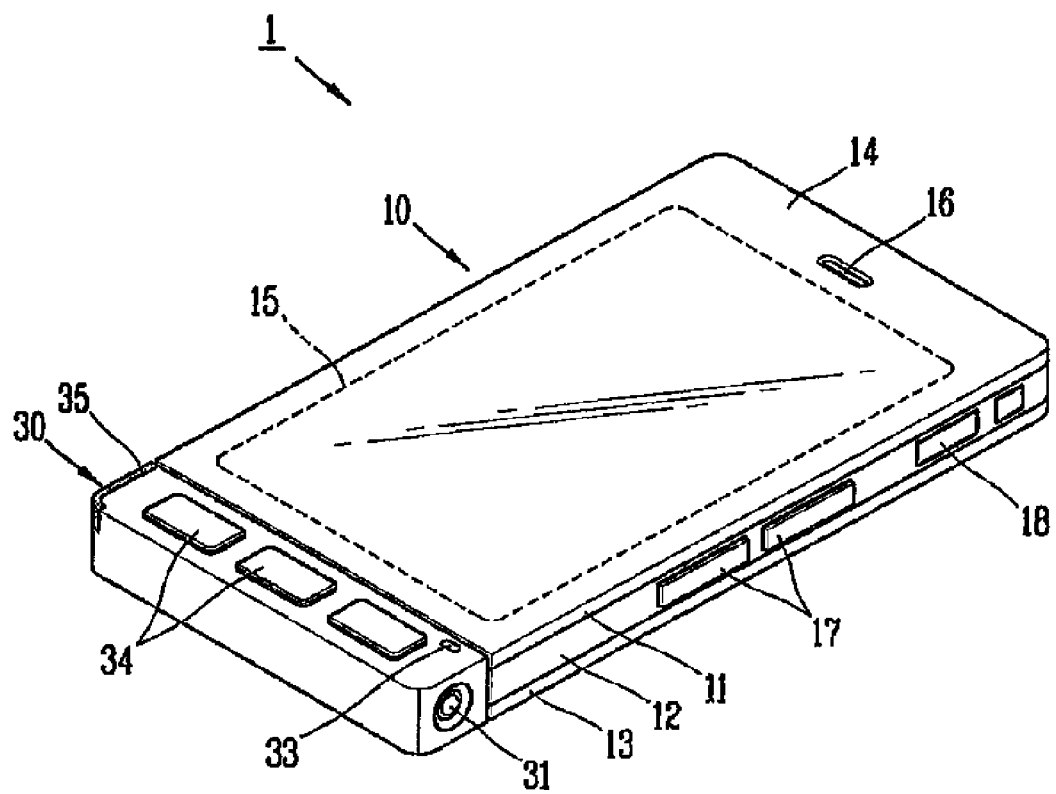
FIG. 1 is a front perspective view showing a mobile terminal according to one embodiment of the present invention.

FIG. 1 is a front perspective view showing a mobile terminal according to one embodiment of the present invention. Referring to FIG. 1, the mobile terminal 1 may include a terminal body 10 having a display 15, and a camera body 30 disposed at a lower end of the terminal body 10 in a longitudinal direction.

The terminal body 10 may also include a window 14 covering almost the whole surface thereof. The window 14 may include a transparent area through which a screen display of the display 15 is displayed, and a non-transparent area which is an area excluding the transparent area.

A case forming an external appearance of the terminal body 10 is comprised of a front case 11 for fixing the window 14, a middle case 12 serving as a frame for supporting a variety of inner components, and a rear case 13 forming a rear appearance thereof. Here, the case may also be comprised of the front case 11 and the rear case 13 without having the middle case 12. The cases may be formed of an injection molded plastic, or formed using metallic material (e.g., stainless steel (STS), titanium (Ti), or the like).

The display 15 and an audio output unit 16 are positioned within the window 14.

The display 15 may include a Liquid Crystal Display (LCD) module, a Transparent Display module, an Organic Light Emitting Diodes (OLED) module, an e-paper, or the like for providing a visual display of information.

A touch sensing means for detecting (sensing) a touch applied onto the window 14 is positioned between the window 14 and the display 15. If a certain position on the window 14 is touched, a preset menu or command corresponding to the position would be inputted.

The audio output unit 16 may output audio data received from a wireless communication module 51 or stored in a memory 57 in a call signal reception mode, a call mode, a recording mode, a voice recognition mode, a broadcast reception mode, and the like. Also, the audio output unit 16 may provide audible outputs related to a particular function (e.g., a call signal reception sound, a message reception sound, etc.) performed by the mobile terminal 1. The audio output unit 16 may include a receiver, a speaker, a buzzer, or the like.

The mobile terminal 1 may be equipped with a means for a radio (wireless) mobile communication. For this, a means for converting a user's voice into a signal and vice versa may be provided inside the terminal body 10.

A side-key 17 and an external interface 18 are disposed at a side surface of the terminal body 10. The side-key 17 may be configured to directly execute a certain function without requiring a user to select a menu displayed on the display 15, or to move a cursor or a pointer.

The external interface 18 serves as an interface with at least one external device connected with the mobile terminal 1. For example, the external devices may include wired/wireless headset ports, external power charger ports, wired/wireless data ports, card sockets, e.g., memory card ports, SIM/UIM/UICC cards, audio input/output (I/O) ports, video I/O ports, earphone ports, among others. The external interface 18 may be used to receive inputs (e.g., data, information, power, etc.) from an external device and transfer the received inputs to one or more elements within the mobile terminal 1 or may be used to transfer data from the mobile terminal to an external device.

Manipulation buttons 34 for manipulating the camera mounted at the camera body 30 are disposed on a front surface of the camera body 30. The manipulation buttons 34 may include keys for activating particular functions, such as zoom-in/zoom-out, an image capturing, mode switching into an image-capturing mode, and the like. The keys of the manipulation buttons 34 may be operated in a push manner or a touch manner, and also inputted by a jog manner (e.g., a jog wheel, a jog switch, etc.). In addition, one or more of the manipulation buttons 34 may be designated as a key for performing a specific function of the mobile terminal 1.

A microphone 33 may be positioned at one side of the camera body 30 and be implemented in a form suitable to transduce the voice of a user, other sounds, or the like.

The camera body 30 is rotatably connected to the terminal body 10.

More specifically, as shown in FIG. 1, a lens 31 is formed at a side surface of the camera body 30, and the lens 31 may be oriented in a direction perpendicular to the surface of the display 15. As shown in FIG. 1, if the camera body 30 is positioned at a certain rotation angle, the camera body 30 is aligned with the terminal body 10, thereby forming a bar shape. As shown in FIG. 1, a state in which the manipulation buttons 34 and the microphone 33 are disposed on the same surface as the display 15, and thereby form a bar shape may be called a "closed configuration," and a state in which the camera body 30 is rotated by a certain rotation angle may be called an "open configuration."

Figure 2:
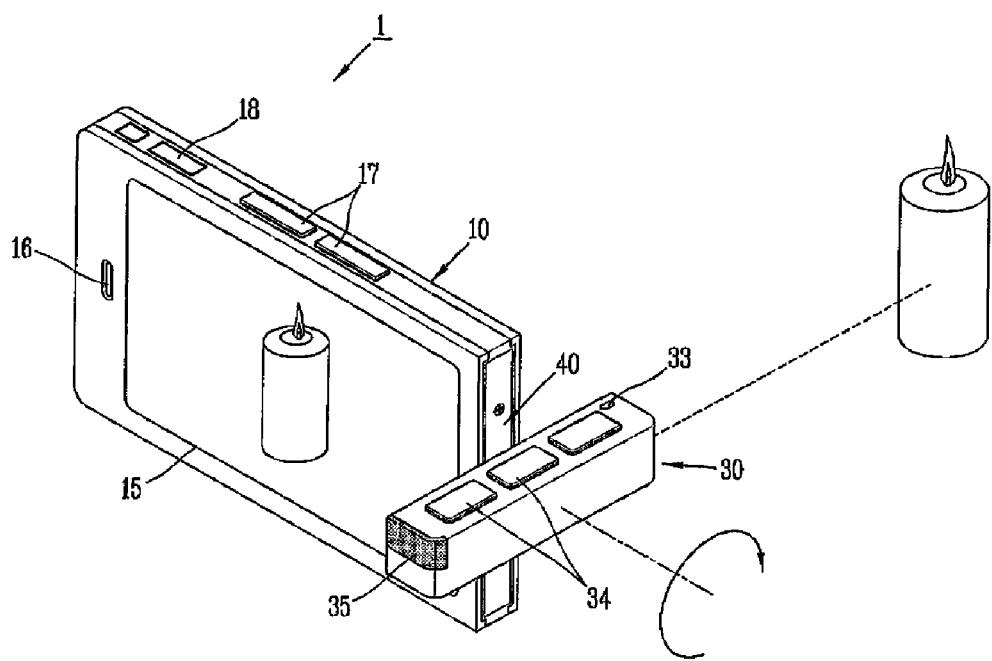
FIG. 2 is a view showing a first operation state in which a camera body, in an image capturing mode, of the mobile terminal in FIG. 1 performs a 90-degree turn in a first direction.

FIG. 2 is a view showing a first operation state in which a camera body 30, in an image-capturing mode, performs a 90-degree turn in a first direction. Referring to FIG. 2, the camera body 30 is rotated in a clockwise direction with respect to the terminal body 10, i.e., in a direction in which the camera lens 31 recedes from the user. Here, the mobile terminal 1 is configured to capture an object to be taken, and the user may preview the object to be taken on the display 15. The display 15 may display the object to be taken as well as a variety of settings or menus set for image-capturing, as an icon for allowing a user's input in a touch-sensitive manner.

In order to control (adjust) zoom-in/zoom-out for the object to be taken or attributes (characteristics) of a picture or a video, the user may directly manipulate the manipulation buttons 34 while holding the camera body 30, without touching the display 15. This allows the user to perform the image-capturing function without being vibrated since one hand holds (supports) the terminal body 10 and another hand holds the camera body 30.

Figure 3:
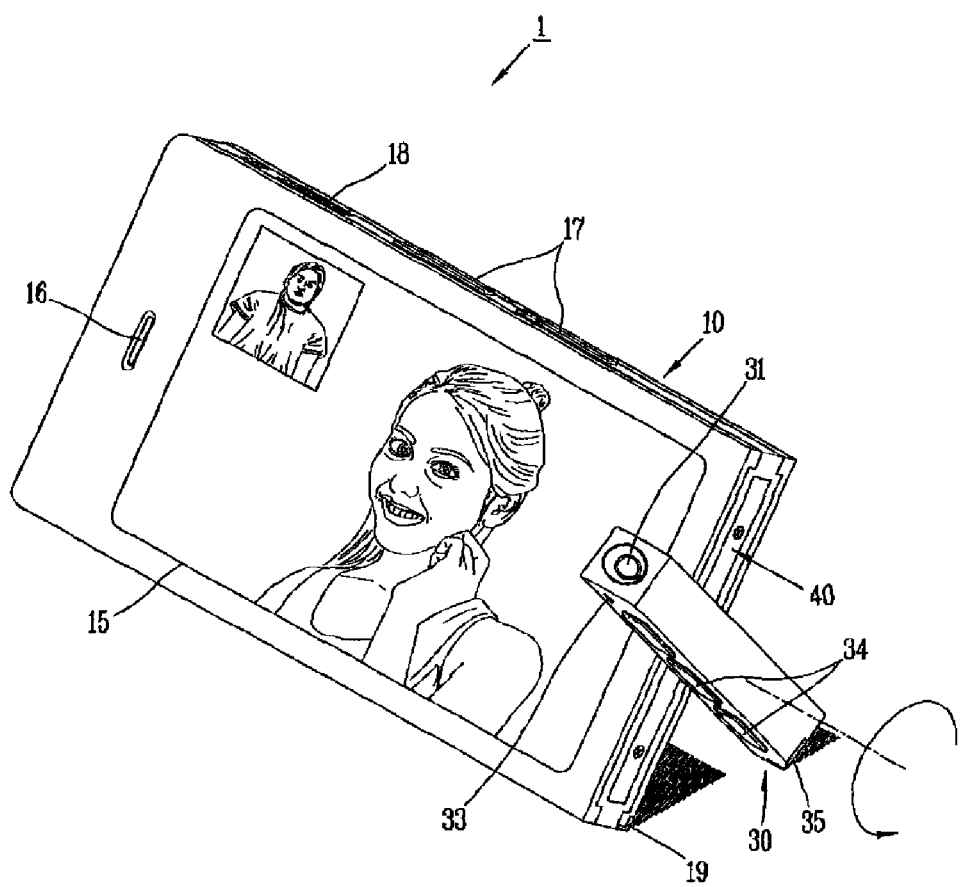
FIG. 3 is a view showing a second operation state in which the camera body, in a video call mode, of the mobile terminal in FIG. 1 performs a nearly 90-degree turn in a second direction.

FIG. 3 is a view showing a second operation state in which the camera body, in a video call mode, performs a partial or full 90-degree turn in a second direction. Referring to FIG. 3, the camera lens 31 is rotated in a counterclockwise direction, i.e., in a direction in which the camera lens 31 approaches the user. In this case, the camera lens 31 may allow the user who is viewing the display 15 to perform a self-image capturing function. Accordingly, the user may capture an object positioned at the same side as the user, or transmit his own picture taken during a video call.

The camera body 30 rotated at a certain angle in the counterclockwise direction is configured to have a length in which the terminal body 10 can maintain a certain angle with respect to the ground. As shown in FIG. 3, the terminal body 10 is supported by the camera body 30, thereby maintaining a position inclined to the ground. Accordingly, a stable screen display during the video call can be provided to another party.

A slide preventing member 35 formed of a rubber or silicon material may be additionally provided at a portion where the camera body 30 and the terminal body 10 contact the ground so as to prevent a slide. The slide preventing member 35 may be padded on the camera body 30 or the terminal body 10 so as to be integrally attached to and detached from the camera body 30 and the terminal body 10.

Figure 4:
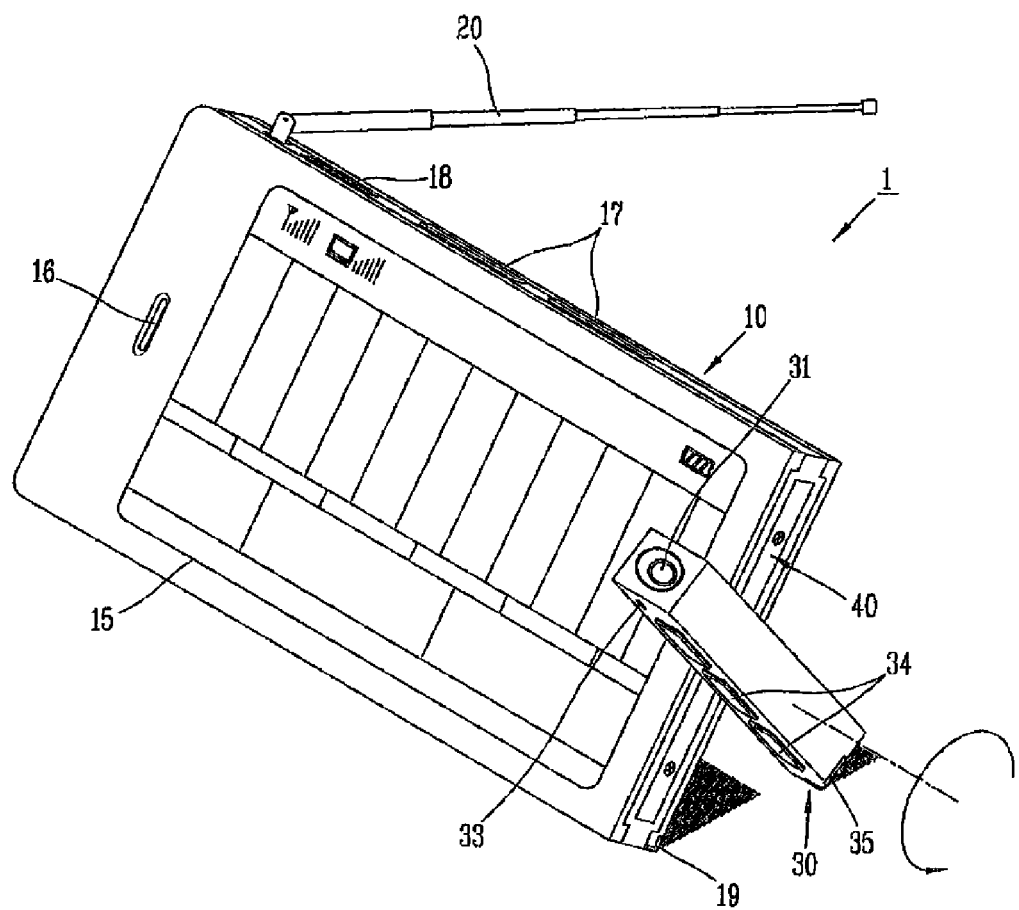
FIG. 4 is a view showing a third operation state in which the camera body, in a broadcast receiving mode, of the mobile terminal in FIG. 1 performs a nearly 90-degree turn in the second direction.

FIG. 4 is a view showing a third operation state in which the camera body, in a broadcast-receiving mode, performs a partial or full 90-degree turn in the second direction. Referring to FIG. 4, an antenna 20 for a broadcast reception may be disposed at one side or region of the terminal body 10.

The antenna 20 may have a length appropriate for receiving a terrestrial wave broadcast having a relatively long wavelength. In addition to the antenna 20 shown in FIG. 4, an internal antenna for a satellite broadcast reception may be provided inside the terminal body 10.

The display 15 of the terminal body 10 propped (supported) by the camera body 30 is configured to output a received broadcast information on the screen display. In this case, the display 15 may output touch-sensitive menus for changing a channel, increasing or reducing a volume, adjusting or storing a broadcast screen display, and the like.

In addition, the manipulation buttons 34 provided in the camera body 30 may include a key for the channel change, the volume increase/reduction, and the like.

The manipulation buttons 34 may include a manipulation key provided to one of the terminal body 10 and the camera body 30, which may be configured to perform a communication related function when the camera body 30 is in the non-rotated position, and configured to perform a camera related function when the camera body 30 is in a rotated position. The communication related function may be one of a call function, a call end function, a clear function, and the like.

Figure 5:
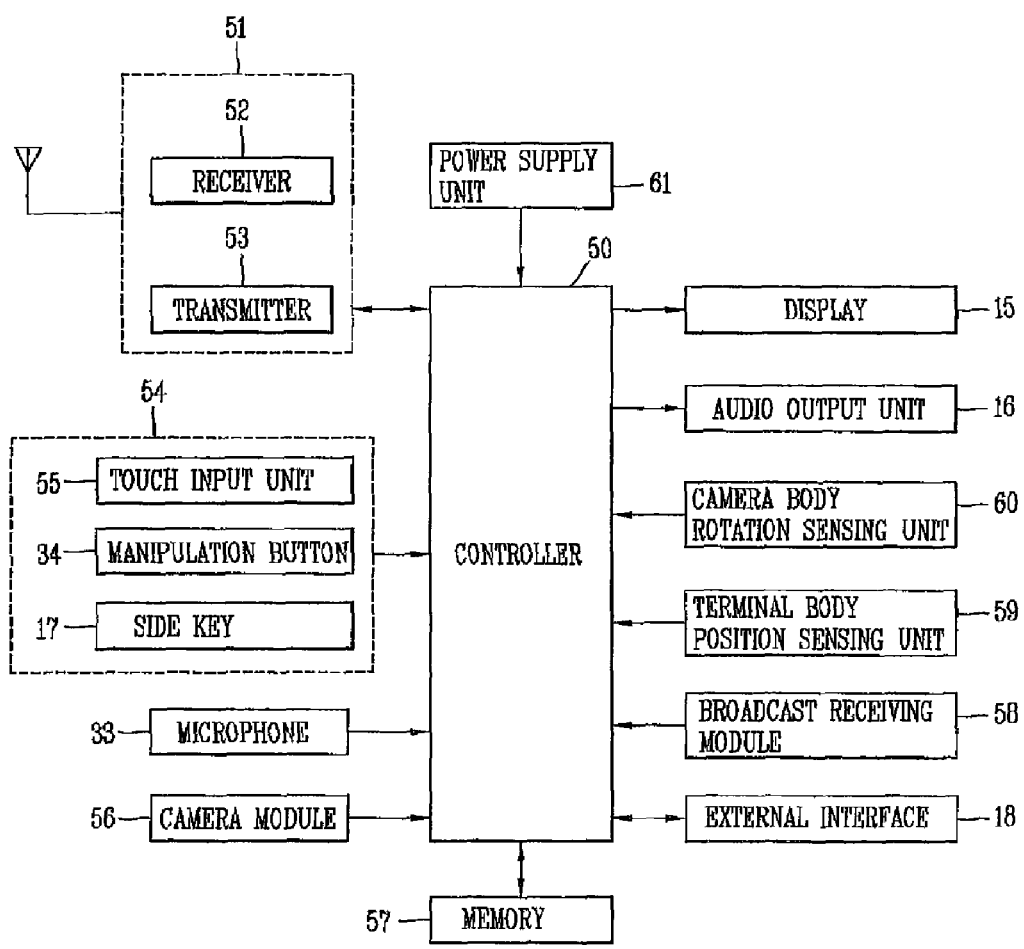
FIG. 5 is a block diagram showing a mobile terminal according to the present invention.

FIG. 5 is a block diagram showing a mobile terminal according to the present invention. An exemplary mobile terminal according to the present invention may include the wireless communication module 51, a manipulation unit 54, the camera module 56, the microphone 33, the display 15, the audio output unit 16, a camera body rotation sensing unit 60, a terminal body position sensing unit 59, the external interface 18, the broadcast receiving module 58, the memory 57, a power supply unit 61, the controller 50, and the like.

The wireless communication module 51 is configured to transmit and receive a radio (wireless) signal with a mobile communication base station through an antenna. For instance, the wireless communication module 51 handles a transmission/reception of voice data, text data, video data and control data under the control of the controller 50. For performing such functions, the wireless communication module 51 may include a transmitter 53 for modulating and transmitting a signal to transmit, and a receiver 52 for demodulating the received signal. The wireless communication module 51 may have an operation bandwidth capable of performing voice communication or video communication.

The manipulation unit 54 may include a touch input unit (not shown) disposed inside the display 15, the manipulation buttons 34, the side-key 17, etc., and provide key input data inputted by a user to control various operations of the mobile terminal to the controller 50. The manipulation unit 54 may include an execution key for providing a direct connection to the Internet or a server so as to upload a picture or a video captured by the camera module 56 or multimedia stored in the memory 57.

The controller 50 is typically configured to control general operations of the mobile terminal, for instance, it performs the controlling and processing associated with voice calls, data communications, video calls, and the like.

In addition, the controller 50 may display a set of modes, on the display 15, which can be selected based on the rotation direction of the camera body 30, as described in FIGS. 1 through 4, according to a signal of the camera body rotation sensing unit 60 (a display mode controller).

In addition, the controller 50 may use the terminal body position sensing unit 59 to control an output of a position (pose, posture) of the terminal body 10 such that the display 15 may always display information in an upright position (upright posture) with respect to the ground.

The camera module 56 is configured to process image frames of still pictures, videos, or the like, obtained by an image sensor. The processed image frames may be displayed on the display 15. The image frames processed by the camera module 56 may be stored in the memory 57 or transmitted to an external entity via the wireless communication module 51 under the control of the controller 50.

In a mode in which the camera module 56 is used, i.e., in a picture/video capturing mode or a video call, the display 15 may iconically display information or text for controlling a variety of functions of the camera module 56 as well as an object to be taken under the control of the controller 50.

The microphone 33 may receive an external analog audio signal (audible sound) in a phone call mode, a recording mode, a voice recognition mode, etc., and process it into digital data. The processed audio (voice) data may be converted for output into a format transmittable to a mobile communication base station via the wireless communication module 51 in the phone call mode. The microphone 33 may store the processed audio data in the memory 57 in the recording mode. The microphone 33 may include various types of noise canceling (or suppression) algorithms to cancel (or suppress) noise generated in the course of receiving and transmitting audio signals.

The display 15 may output information processed in the mobile terminal. For example, when the mobile terminal is in the phone call mode or the video call mode, the display 15 may display a User Interface (UI) or a Graphic User Interface (GUI) associated with a call or other communication on a screen display thereof. When the mobile terminal is in the video call mode or the image capturing mode, the display 15 may display a captured and/or received image, a UI, a GUI, and the like on its screen display.

The display 15 may output an item or a list which can be inputted by the touch input unit 55.

The audio output unit 16 may output audio data received from the wireless communication module 51 or stored in the memory 57, under the control of the controller 50, in a call signal reception mode, a call mode, a recording mode, a voice recognition mode, a broadcast reception mode, and the like.

Also, the audio output unit 16 may provide audible outputs related to a particular function (e.g., a call signal reception sound, a message reception sound, etc.) performed by the mobile terminal. The audio output unit 16 may include a speaker, a receiver, a buzzer, or the like.

The camera body rotation sensing unit 60 may sense whether the camera body 30, as configured in FIGS. 1 through 4, is rotated in a clockwise direction or a counterclockwise direction with respect to the terminal body 10. For this, the terminal body 10 may include a magnetic sensor, an optical sensor, etc., and the camera body 30 may include a magnet.

As information sensed (detected) by the camera body rotation sensing unit 60 is forwarded to the controller 50, the controller 50 may adjust a set of modes according to the rotation direction of the camera body 30 and then output the set of available modes on the display 15.

The terminal body position sensing unit 59 may sense the position (posture) of the terminal body 10 with respect to the ground, and then apply a signal to the controller 50. The controller 50 may output capturing-related information displayed on the display 15 as an upright image if the signal is received from the terminal body position sensing unit 59 and if the mobile terminal is in picture- or video-capturing mode. For this, the terminal body position sensing unit 59 may include a geomagnetic sensor disposed in the terminal body 10 so as to sense terrestrial magnetism.

The external interface 18 serves as an interface with all external devices connected to the mobile terminal. Here, the external devices refer to, for instance, a wired/wireless headset, an external charger, a wired/wireless data port, a card socket (e.g., a memory card, SIM/UIM card), an audio input/output terminal, a video input/output terminal, an earphone, and the like.

Data is transferred or power is supplied to such external interface 18 from the external device. Then, the external interface 18 transfers the data or the power to each of the components inside the mobile terminal, or transmits data in the mobile terminal to the external device.

The broadcast receiving module 58 receives a broadcast signal and/or broadcast-related information from an external broadcast managing server through a broadcast channel. The broadcast channel may include a satellite channel or a ground wave channel. The broadcast managing server may refer to a server which generates and transmits a broadcast signal and/or broadcast-related information, or a server which receives a broadcast signal and/or broadcast-related information that are already generated and then transmits the received signal/information to a terminal.

The broadcast-related information may refer to information regarding a broadcast channel, a broadcast program, or a broadcast service provider. The broadcast signal may include a broadcast signal that a data broadcast signal is associated with a TV broadcast signal or a radio broadcast signal, as well as the TV broadcast signal, the radio broadcast signal and the data broadcast signal.

In addition, the broadcast-related information may be provided via a mobile communication network. Further, the broadcast-related information may be implemented in various forms, for instance, an EPG (Electronic Program Guide) of a DMB (Digital Multimedia Broadcasting), or an ESG (Electronic Service Guide) of a DVB-H (Digital Video Broadcast-Handheld), or the like.

Also, the broadcast receiving module 58 receives a broadcast signal by using various broadcast systems. In particular, the digital broadcast signal can be received by using a digital broadcast system, such as a DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), and ISDB-T (Integrated Services Digital Broadcast-Terrestrial). The broadcast receiving module 58 is adaptively configured to all broadcast systems for providing a broadcast signal as well as the above-mentioned digital broadcast systems.

The memory 57 may store software programs or the like used for the processing and controlling functions performed by the controller 50, or may temporarily store inputted/outputted data (e.g., a phonebook, messages, still images, video, etc.). The memory 57 may include at least one type of storage medium including a flash memory type, a hard disk type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile terminal may cooperate with a web storage device on the internet that remotely performs the storage function of the memory 57.

The power supply unit 61 receives external or internal power and supplies power required for the operations of the respective elements to the terminal body 10 and the camera body 30 under the control of the controller 50.

Figure 6:
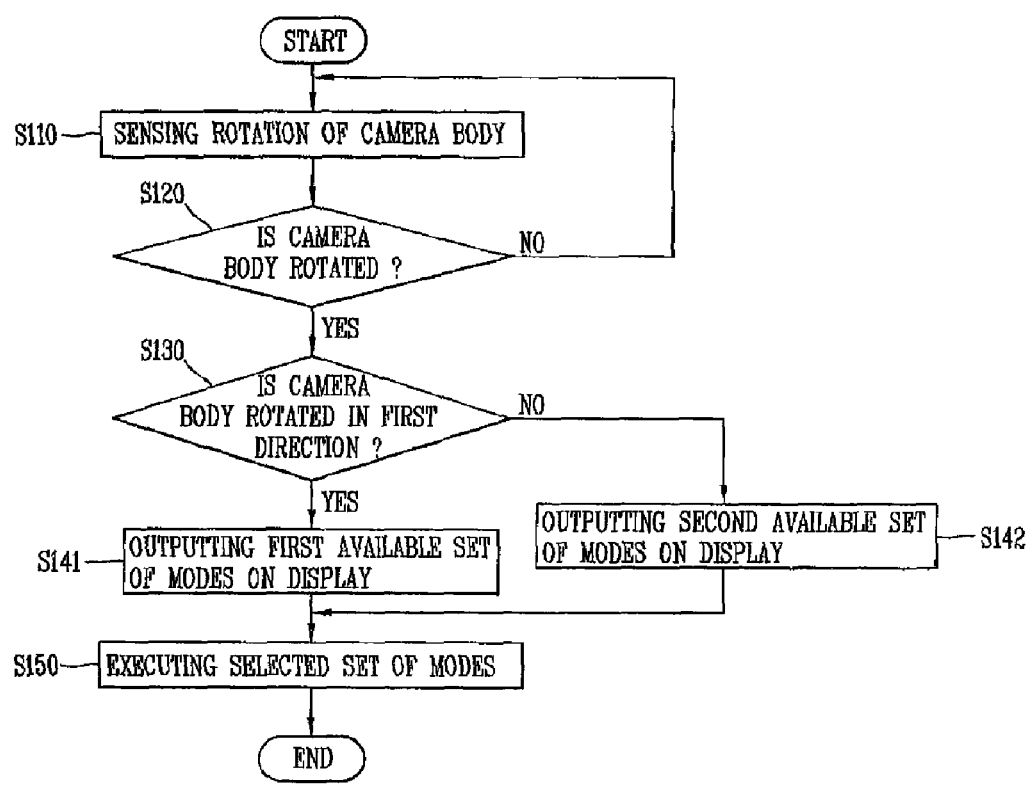
FIG. 6 is a flowchart showing a method for controlling a screen display displayed on a display depending on a rotation of the camera body according to one embodiment of the present invention.

FIG. 6 is a flowchart showing a method for controlling a screen display displayed on a display depending on a rotation of the camera body according to one embodiment of the present invention.

The camera body 30 may be rotated in the clockwise or counterclockwise direction with respect to the terminal body 10. If the camera body 30 is rotated, a signal is generated for switching a mode corresponding to the generated signal.

In the closed configuration where the camera body 30 is not rotated with respect to the terminal body 10 as shown in FIG. 1, the camera body rotation sensing unit 60 is configured to sense (detect) whether or not the camera body 30 is rotated (S110).

Next, if the camera body 30 is sensed to rotate, the camera body rotation sensing unit 60 is configured to determine whether the rotation direction is the clockwise or counterclockwise direction (S120, S130).

If the camera body 30 is rotated in the clockwise direction (i.e., the lens 31 of the camera body 30 recedes from the user), the controller 50 may output a first set of modes which can be inputted in a touch-sensitive manner on the display 15 (S141). Here, the first set of modes may include the picture capturing mode and the video capturing mode. In addition, the user may preview (enjoy) captured pictures and videos.

Figure 7A:
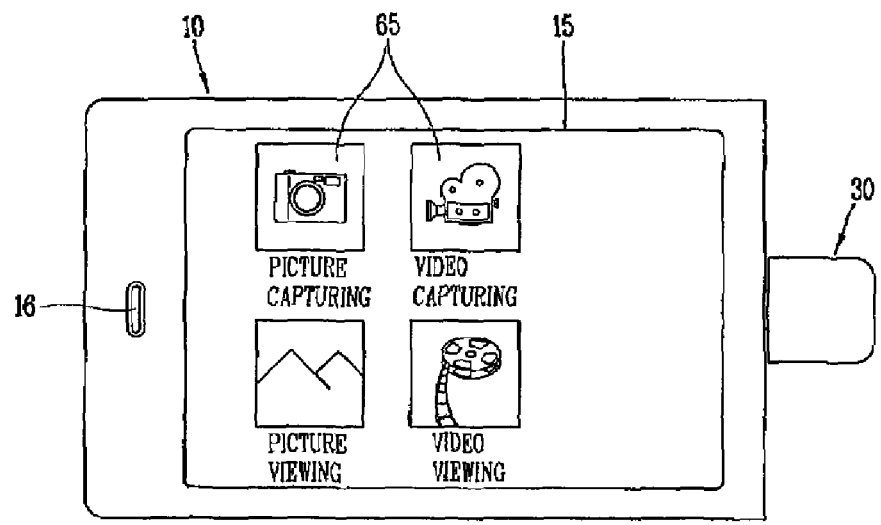
FIGS. 7A and 7B are views respectively showing contents on a display screen depending on a rotation of the camera body according to one embodiment of the present invention.

FIG. 7A shows exemplary contents on a screen display of the display 15. Referring to FIG. 7A, modes including the picture capturing, the video capturing, viewing picture and viewing video are displayed on the display 15 with touch-sensitive icons 65.

If the camera body 30 is rotated in the counterclockwise direction (i.e., the lens 31 of the camera body 30 approaches the user), the controller 50 may output a second set of modes which can be inputted in a touch-sensitive manner on the display 15 (S142). Here, the second set of modes may include the picture capturing mode, the video capturing mode and the picture/video viewing. If the mobile terminal is configured to make a video call, the second set of modes displayed on the display 15 may additionally include the video call mode. If the mobile terminal is configured to include the broadcast receiving module 58, the second set of modes may additionally include the broadcast receiving mode.

Figure 7B:
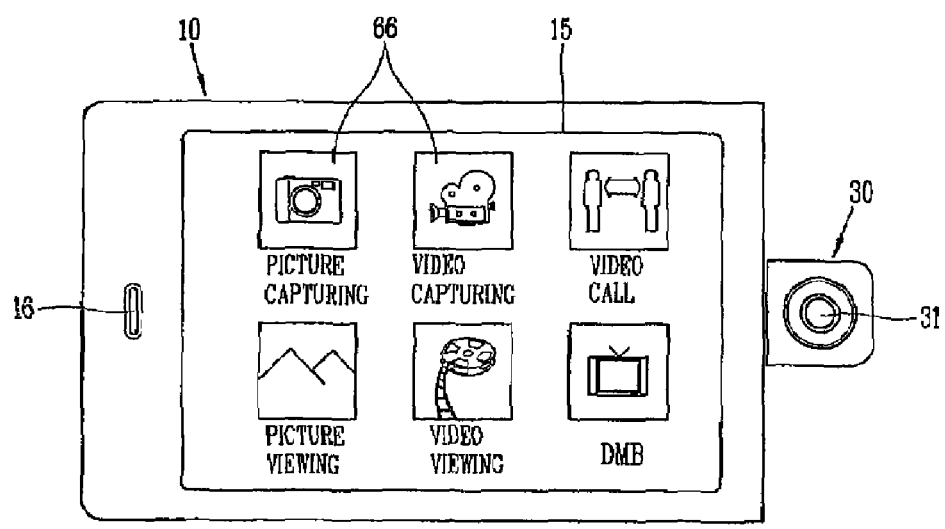

FIG. 7B shows exemplary contents on a screen display of the display 15. Referring to FIG. 7B, touch-sensitive icons 66 allowing the user to select one of the picture/video capturing, the video call, the broadcast receiving, picture/video viewing, are displayed on the display 15.

Accordingly, based on the rotation direction of the camera body 30, an operation to be performed by the mobile terminal may be displayed on the display screen, thereby facilitating a convenient and accurate use of the camera body 30.

Figure 8:
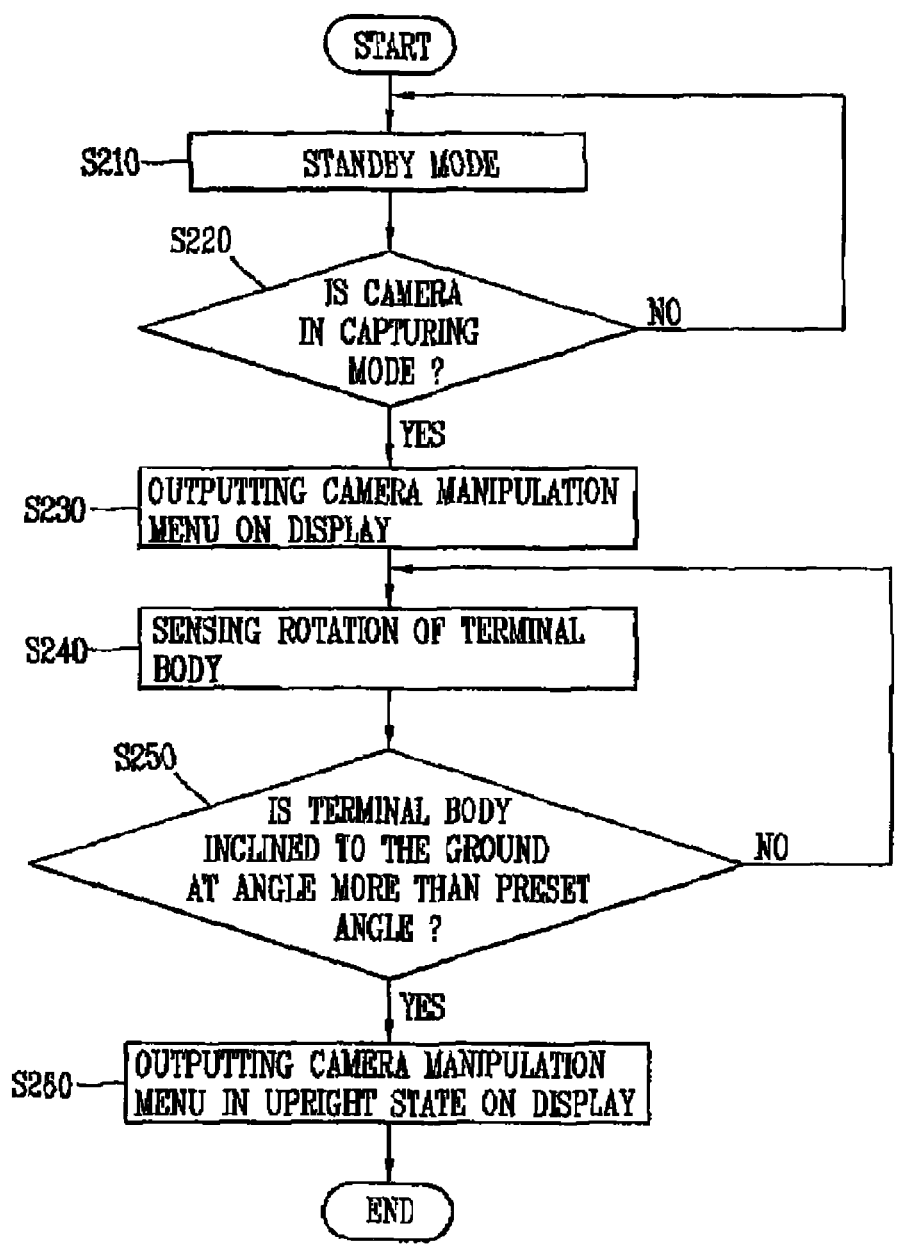
FIG. 8 is a flowchart showing a method for controlling a screen display displayed on the display depending on a position(posture) of a terminal body according to one embodiment of the present invention.

FIG. 8 is a flowchart showing a method for controlling a screen display displayed on the display depending on a position (posture) of a terminal body according to one embodiment of the present invention. As shown in the drawing, when the camera body 30 is rotated, a position of the terminal body 10 with respect to the ground is detected. Then, capture-related control information displayed on the display 15 is converted for output into an upright image with respect to the ground.

First, it is determined whether the mobile terminal in a standby mode (S210) is put into the picture capturing mode or the video capturing mode (S220). In the capturing mode, a variety of information related to the camera manipulation may be displayed with icons or menus on the display 15 (S230). The variety of information may include a remaining capacity of a memory, battery charge remaining, a resolution of a picture to be taken, an on/off state of a flash, and the like.

Figure 9A:
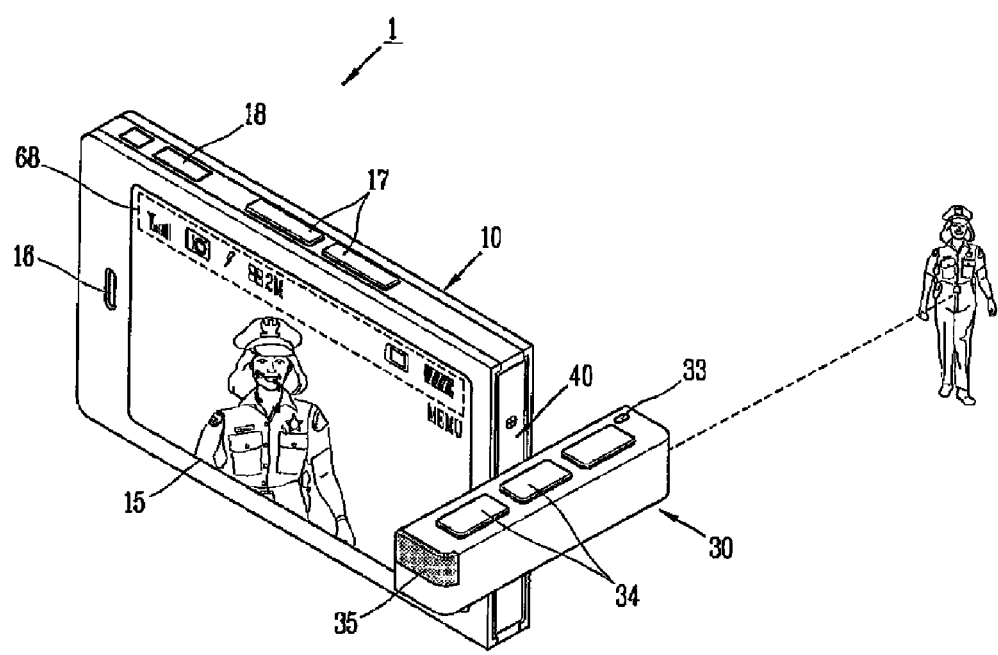
FIGS. 9A and 9B are views respectively showing contents on a display screen depending on a position/(posture) of the terminal body according to one embodiment of the present invention.

FIG. 9A shows the above-described example. As shown in FIG. 9A, when the mobile terminal is in the picture- or video-capturing mode, an object displayed on the display 15 and the icons 68 for displaying the camera manipulation-related information are all displayed in an upright posture.

Next, a position (posture) of the terminal body 10 with respect to the ground is detected (S240). Since the display 15 is mounted at the terminal body 10, if the terminal body 10 is positioned inclined to the ground, the display 15 would also be inclined with the same inclination angle as the terminal body 10.

If the terminal body 10 is sensed to be inclined with respect to the ground at an angle more than a preset angle, the controller 50 may output the camera manipulation menus, etc. displayed on the display 15 in an upright posture (S260). That is, an image of the object to be taken remains in its original position, but the camera manipulation buttons displayed on the display 15 are displayed in an upright posture with respect to the ground, thereby allowing the user to easily recognize those menus.

Figure 9B:
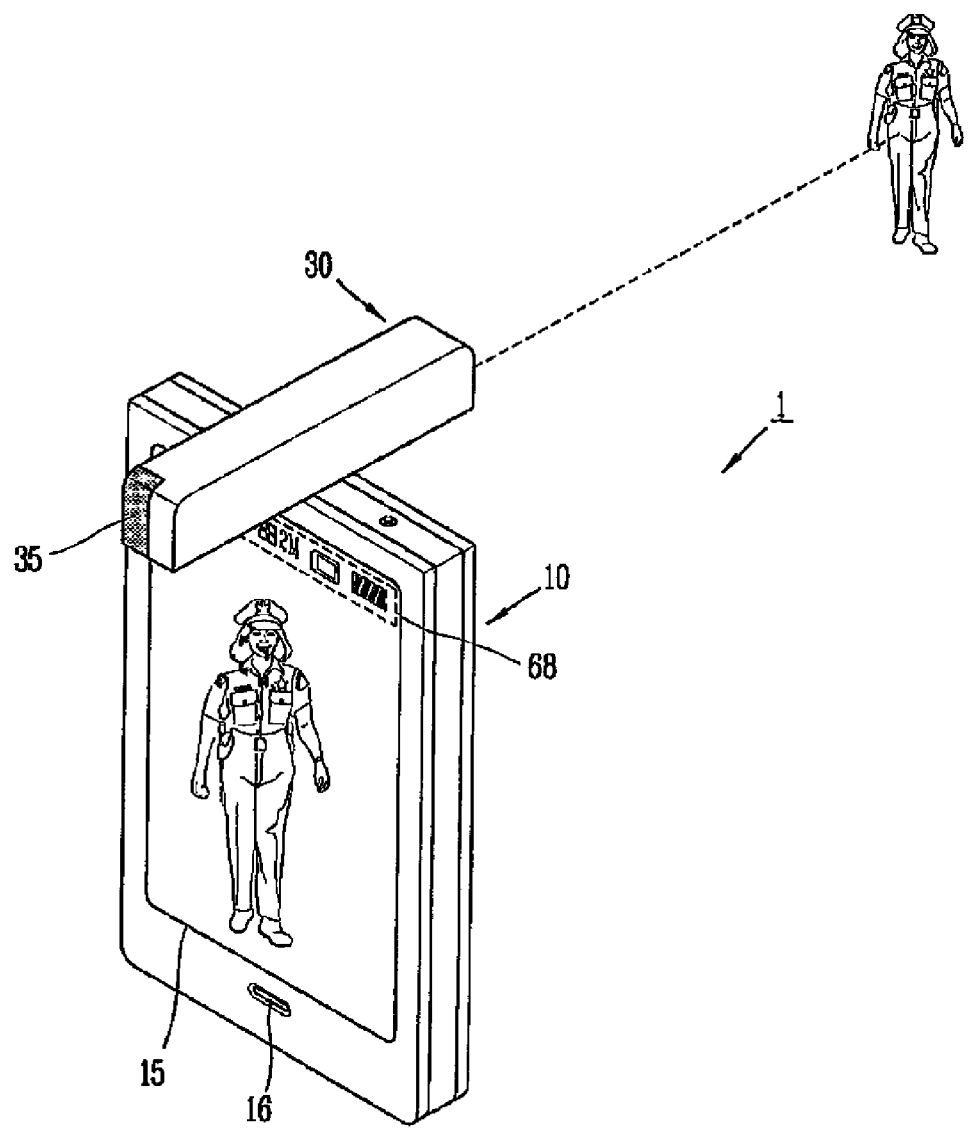

FIG. 9B shows the above-described example. Referring to FIG. 9B, the terminal body 10 is rotated 90° with respect to the ground, and the icons 68 or menus indicating the camera manipulation-related information as well as the object to be taken are all displayed in the upright posture.

Figure 10:
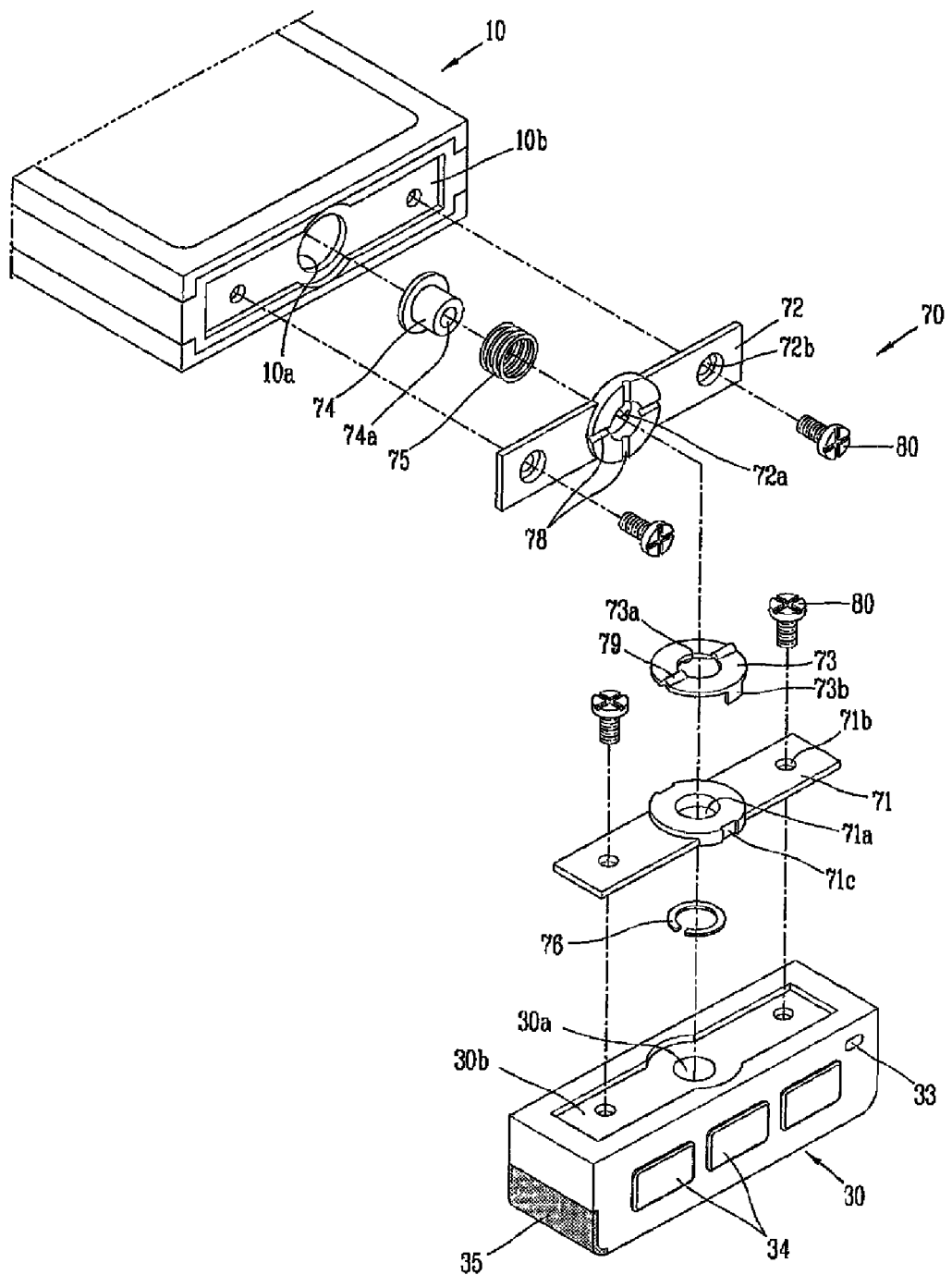
FIG. 10 is an exploded perspective view showing a hinge module according to one embodiment of the present invention.

FIG. 10 is an exploded perspective view showing a hinge module according to one embodiment of the present invention. The hinge module 70 according to this embodiment may include a first hinge member 71 fixed to the camera body 30, a second hinge member 72 fixed to the terminal body 10, and a first elastic stopper 73 for rotating by engagement with the first hinge member 71.

Through-holes 71a, 72a, 73a for passing a shaft 74 are respectively disposed at the first hinge member 71, the second hinge member 72, and the first elastic stopper 73. The shaft 74 is provided with a through-hole 74a for passing a cable which connects the terminal body 10 and the camera body 30.

Mounting grooves 10b, 30b each for mounting the first and second hinge members 71, 72 are formed in a shape corresponding to the first and second hinge members 71, 72 at the camera body 30 and the terminal body 10. The first and second hinge members 71, 72 may be fixed to the mounting grooves 10b, 30b by a threaded coupling. Here, the first hinge member 71 and the second hinge member 72 may respectively include threaded holes 71b, 72b for the threaded coupling.

Through-holes 10a, 30a for passing the cable which electrically connects the terminal body 10 and the camera body 30 may be respectively formed at the mounting grooves 10b, 30b. The cable is configured to connect the terminal body 10 and the camera body 30 through the through-hole 74a formed at the shaft 74.

A restricting recess 71c for restricting the first elastic stopper 73 may be formed at the first hinge member 71, and a restricting protrusion 73b inserted into the restricting recess 71c so as to restrict a rotation between the first elastic stopper 73 and the first hinge member 71 may be formed at the first elastic stopper 73. Alternatively, the restricting recess 71c and the restricting protrusion 73b may be respectively formed at the first elastic stopper 73 and the first hinge member 71. Alternatively, the first hinge member 71 and the first elastic stopper 73 may be integrally formed.

Stopping recesses 78 concaved in a shaft direction are formed at the second hinge member 72. The stopping recesses 78 may be formed to have a long length in a radial direction, or a plurality of stopping recesses 78 may be formed in certain intervals according to a preset angle to stop the camera body 30. In this example, the stopping recesses 78 are formed to have 90° intervals from one another such that the camera body 30 stops rotating every time it rotates 90°.

Protrusions 79 protruding in correspondence to the stopping recesses 78 are formed on the first elastic stopper 73, and the protrusions 79 may be formed to be stopped by the stopping recesses 78 due to an elastic effect.

The first elastic stopper 73 may be formed as a plate spring shape, and the protrusion 79 may be formed in a shape corresponding to the stopping recesses 78 so as to be stopped by the stopping recesses 78. Here, the stopping recesses 78 and the protrusions 79 may have an inclination surface so as to release the stopping when they perform a relative rotation with each other.

Meanwhile, a spring 75 may be disposed between the shaft 74 and the second hinge member 72 such that the second hinge member 72 always contacts the first elastic stopper 73.

If the spring 75, the second hinge member 72, the first elastic stopper 73, and the first hinge member 71 are inserted to the shaft 74, a snap ring 76 is fitted (coupled) to an end of the shaft 74, thereby completing an assembly process of the hinge module 70.

Figure 11A:
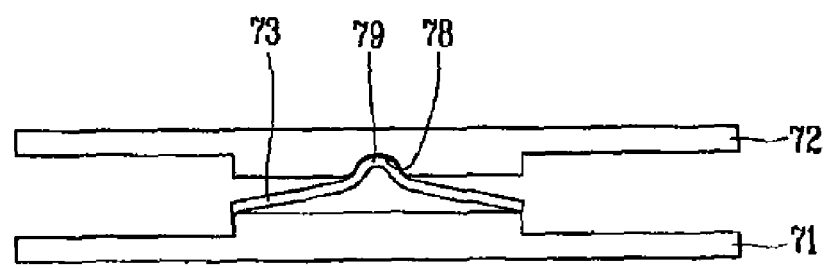
FIGS. 11A and 11B are side views respectively showing an operation state of the hinge module in FIG. 10.
Figure 11B:
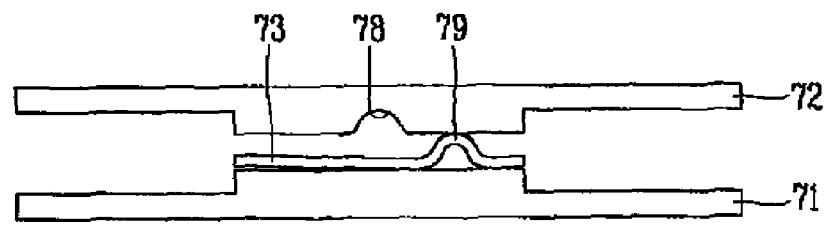

FIGS. 11A and 11B are side views respectively showing an operation state of the hinge module in FIG. 10. FIG. 11A shows the closed configuration (or open configuration) of the camera body 30 in which the protrusion 79 is stopped by the stopping recess 78.

In this case, if the user rotates the camera body 30, an elastic deformation, as shown in FIG. 11B, occurs in the protrusion 79 due to the rotation force, thereby releasing the stopping of the protrusion 79 from the stopping recess 78. Accordingly, the first hinge member 71 and the first elastic stopper 73 perform a relative rotation with respect to the second hinge member 72.

If the camera body 30 reaches to a certain angle during rotation, the protrusion 79, as shown in FIG. 11A, is stopped again by the stopping recess 78, thereby stopping the relative rotation of the first hinge member 71 and the first elastic stopper 73, thus to stop the camera body 30 at a certain angle.

As so far described, the first hinge member 71 is fixed to the camera body 30, and the second hinge member 72 is fixed to the terminal body 10. Alternatively, the first hinge member 71 may be fixed to the terminal body 10, and the second hinge member 72 may be fixed to the camera body 30.

Figure 12:
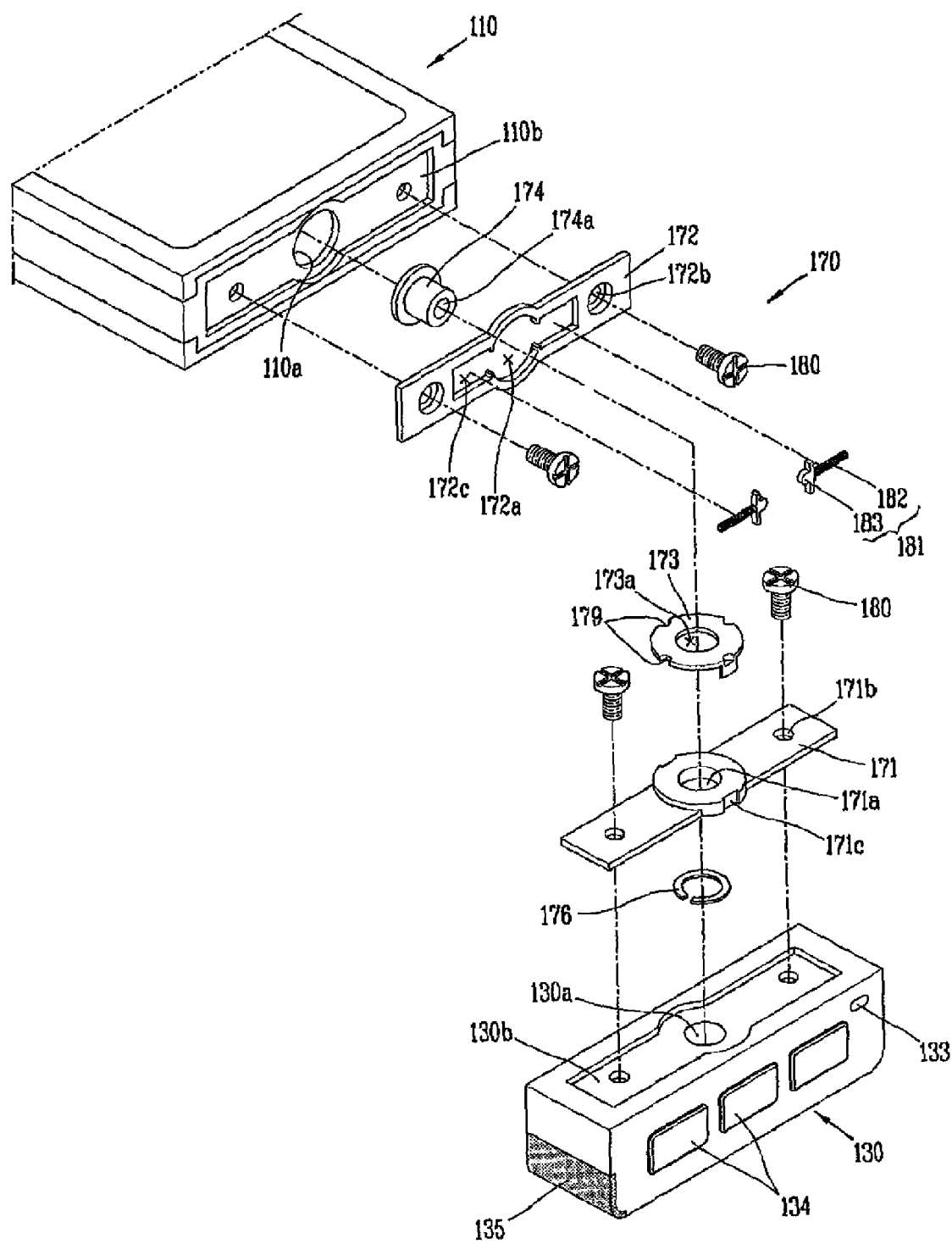
FIG. 12 is an exploded perspective view showing the hinge module according to another embodiment of the present invention.

FIG. 12 is an exploded perspective view showing the hinge module according to another embodiment of the present invention. The hinge module 170 according to this embodiment may include a first hinge member 171 fixed to a camera body 130, a second hinge member 172 fixed to a terminal body 110, a cam member 173 for rotating by engagement with the first hinge member 171, and a second elastic stopper 181 for rotating by engagement with the second hinge member 172.

The hinge module 170 in this example has the same construction as the previously described example, in which the camera body 130 is fixed to the first hinge member 171, the first hinge member 171 to the cam member 173, and the terminal body 110 to the second hinge member 172, respectively. Therefore, detailed explanations therefor are omitted. Here, the cam member 173 may be integrally formed with the first hinge member 171.

The cam member 173 may include stopping recesses 179 concavely formed on an outer circumference thereof in a radial direction, and the stopping recesses 179 may be formed at certain intervals from one another depending on a preset angle to stop the rotation of the camera body 130.

The second elastic stopper 181 may include protrusion members 183 protruding in correspondence to the stopping recesses 179 so as to be stopped by the stopping recesses 179 due to an elastic effect. The protrusion members 183 are elastically supported by a spring 182.

The second hinge member 172 may include a receiving space 172c at a periphery of the rotation shaft, and the protrusion member 183 is mounted at the receiving space 172c so as to perform a linear movement in the periphery of the rotation shaft. An end of the protrusion member 183 may have a shape corresponding to the stopping recess 179 so as to be stopped by the stopping recess 179.

Figure 13A:
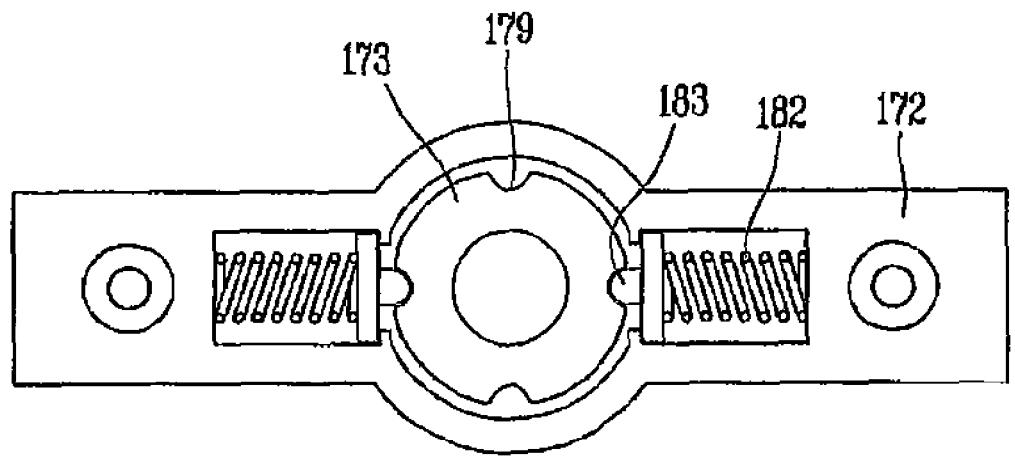
FIGS. 13A and 13B are cross-sectional views respectively showing the operation state of the hinge module in FIG. 12.
Figure 13B:
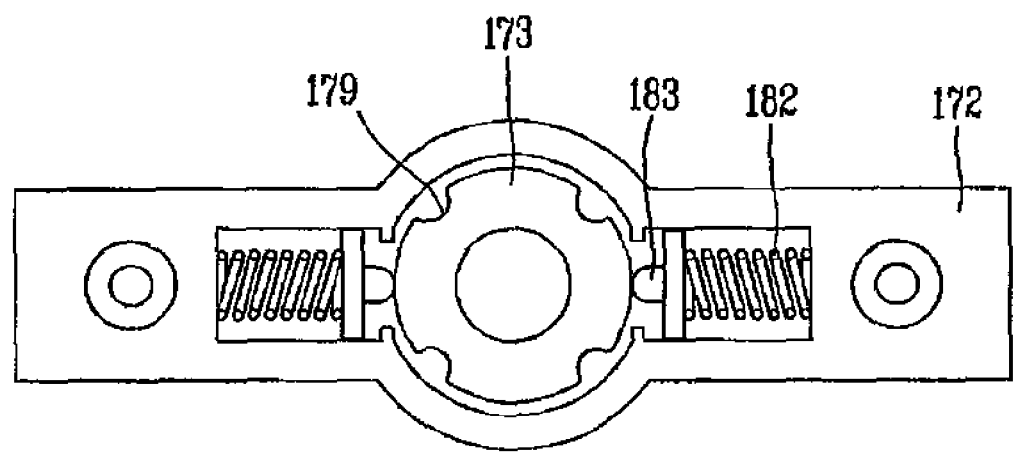

FIGS. 13A and 13B are cross-sectional views respectively showing the operation state of the hinge module in FIG. 12.

FIG. 13A shows the closed configuration (or open configuration) of the camera body 130 in which the protrusion member 183 is stopped by the stopping recess 179 of the cam member 173.

If the user rotates the camera body 130, the protrusion member 183, as shown in FIG. 13B, performs a linear movement in the periphery of the rotation shaft by the rotation force, thereby releasing the stopping of the protrusion member 183 from the stopping recesses 179. Accordingly, the first hinge member 171 and the cam member 173 perform a relative rotation with respect to the second hinge member 172.

If the camera body 130 reaches a certain angle during rotation, the protrusion member 183, as shown in FIG. 13A, is stopped again by the stopping recess 179 due to an elastic force of the spring 182, thereby stopping the relative rotation of the first hinge member 171 and the second elastic stopper 181, thus to stop the rotation of the camera body 130 with respect to the terminal body 110 at a certain angle.

As so far described, the first hinge member 171 is fixed to the camera body 130, and the second hinge member 172 is fixed to the terminal body 110. Alternatively, the first hinge member 171 may be fixed to the terminal body 110, and the second hinge member 172 may be fixed to the camera body 130.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a terminal body having a wireless communication module and a display;
    a camera body rotatably attached to the terminal body, the camera body being rotatable with respect to the terminal body in a first clockwise direction and in a second counterclockwise direction;
    a display mode controller configured to control the display such that a first available set of modes is outputted on the display when the camera body is rotated in the first direction, and a second available set of modes is outputted on the display when the camera body is rotated in the second direction; and
    a terminal body position sensing unit for sensing a position of the terminal body with respect to the ground when the camera body is rotated, and outputting capture-related control information displayed on the display in an upright state with respect to the ground,
    wherein the terminal body position sensing unit comprises:
        a geomagnetic sensor disposed in the terminal body for sensing terrestrial magnetism; and
        a controller for receiving a sensing signal from the geomagnetic sensor so as to properly orient the capture-related control information displayed on the display.

2. The mobile terminal of claim 1, wherein the display further comprises a touch input unit for performing a touch input function.

3. The mobile terminal of claim 1, wherein the camera body has a length long enough to support the terminal body when rotated by a predetermined rotation angle such that the terminal body maintains a certain angle with respect to the ground.

4. The mobile terminal of claim 3, further comprising:
    a slide preventing member disposed at a portion where the camera body and the terminal body contact a ground surface so as to prevent the mobile terminal from sliding with respect to the ground surface.

5. The mobile terminal of claim 1, wherein the first direction is one in which the lens recedes from the user, and the first available set of modes includes at least one of a picture capturing mode and a video capturing mode.

6. The mobile terminal of claim 5, wherein the second direction is one in which the lens approaches the user, and the second available set of modes includes the first available set of modes plus an additional mode.

7. The mobile terminal of claim 6, wherein the additional mode includes at least one or more of a picture viewing mode, a video viewing mode and a video call mode.

8. The mobile terminal of claim 6, wherein the terminal body further includes a broadcast receiving module, and the second available set of modes further includes a broadcast receiving mode.

9. The mobile terminal of claim 1, wherein the camera body further comprises a plurality of manipulation buttons for reproducing or editing a captured picture or video.

10. The mobile terminal of claim 9, wherein the manipulation buttons include zoom-in/zoom-out buttons and a capturing button.

11. The mobile terminal of claim 1, further comprising:
    at least one manipulation key provided to one of the terminal body and the camera body,
    wherein the manipulation key performs a communication related function when the camera body is in the non-rotated position, and performs a camera related function when the camera body is in the rotated position.

12. The mobile terminal of claim 11, wherein the communication related function is one of a call function, and end function, and a clear function.

13. A mobile terminal, comprising:
    a terminal body having a wireless communication module and a display;
    a camera body rotatably attached to the terminal body, the camera body being rotatable with respect to the terminal body in a first clockwise direction and in a second counterclockwise direction;
    a display mode controller configured to control the display such that a first available set of modes is outputted on the display when the camera body is rotated in the first direction, and a second available set of modes is outputted on the display when the camera body is rotated in the second direction; and
    a hinge module disposed between the terminal body and the camera body and configured to stop rotation of the camera body when the camera body reaches a certain rotation angle,
    wherein the hinge module comprises:
        a first hinge member fixed to one of the terminal body and the camera body;
        a second hinge member fixed to another one of the terminal body and the camera body, and having a stopping recess concavely formed in a shaft direction; and
        an elastic stopper rotating by engagement with the first hinge member, and having a protrusion protruding in correspondence to the stopping recess such that the protrusion is stopped by the stopping recess by an elastic effect.

14. A mobile terminal, comprising:

a terminal body having a wireless communication module and a display;

a camera body rotatably attached to the terminal body, the camera body being rotatable with respect to the terminal body in a first clockwise direction and in a second counterclockwise direction;

a display mode controller configured to control the display such that a first available set of modes is outputted on the display when the camera body is rotated in the first direction, and a second available set of modes is outputted on the display when the camera body is rotated in the second direction; and a hinge module disposed between the terminal body and the camera body and configured to stop rotation of the camera body when the camera body reaches a certain rotation angle, wherein the hinge module comprises:

a first hinge member fixed to one of the terminal body and the camera body;

a second hinge member fixed to another one of the terminal body and the camera body;

a cam member restricted by the first hinge member and having a stopping recess concavely formed on an outer circumference thereof in a radial direction; and an elastic stopper rotating by engagement with the second hinge member, and having a protrusion protruding in correspondence to the stopping recess such that the protrusion is stopped by the stopping recess by an elastic effect.

* * * * *